United States Patent

[11] 3,582,751

| [72] | Inventors | Hermann Rosshirt;<br>Albert C. Leenhouts, both of Hartford, Conn. |
|---|---|---|
| [21] | Appl. No. | 780,735 |
| [22] | Filed | Dec. 3, 1968 |
| [45] | Patented | June 1, 1971 |
| [73] | Assignee | The Superior Electric Company<br>Bristol, Conn. |

[54] NUMERICALLY CONTROLLED ABSOLUTE MOTOR SYSTEM
8 Claims, 1 Drawing Fig.

[52] U.S. Cl. ............................................. 318/696, 318/601
[51] Int. Cl. ....................................................... H02k 37/00
[50] Field of Search ............................................ 318/138, 254, 20.310, 601; 310/49

[56] References Cited
UNITED STATES PATENTS

| 3,206,683 | 9/1965 | Davis et al. | 318/(20.310) |
| 3,237,313 | 3/1966 | Gevas | 318/(20.310) |
| 3,241,017 | 3/1966 | Madsen et al. | 310/49X |
| 3,374,410 | 3/1968 | Cronquist et al. | 318/254X |
| 3,414,786 | 12/1968 | Kasmer et al. | 318/(20.310) |
| 3,427,442 | 2/1969 | Sklaroff | 318/(20.310) |
| 3,443,181 | 5/1969 | Kozol et al. | 318/138 |

Primary Examiner—G. R. Simmons
Attorney—Johnson & Kline

ABSTRACT: A numerically controlled motor system which accepts digital information of a desired position in absolute coordinates and supplies a train of pulses corresponding to the number of steps required of a stepping motor to eliminate the difference between the desired position and the previous position with the stepping motor moving a step for each pulse. The acceleration and deceleration of the motor at the ends of its movement are controlled by initially feeding all the pulses into a counter and having only a fraction of the pulses of the train being directed to step the motor. After completion of the train, the counter is uncounted with only a complementary fraction of each change of count producing a motor step. The cessation of the train of pulses provides a signal of an intermediate point in the total movement of the motor which enables control over acceleration and deceleration of the motor by the count in the counter.

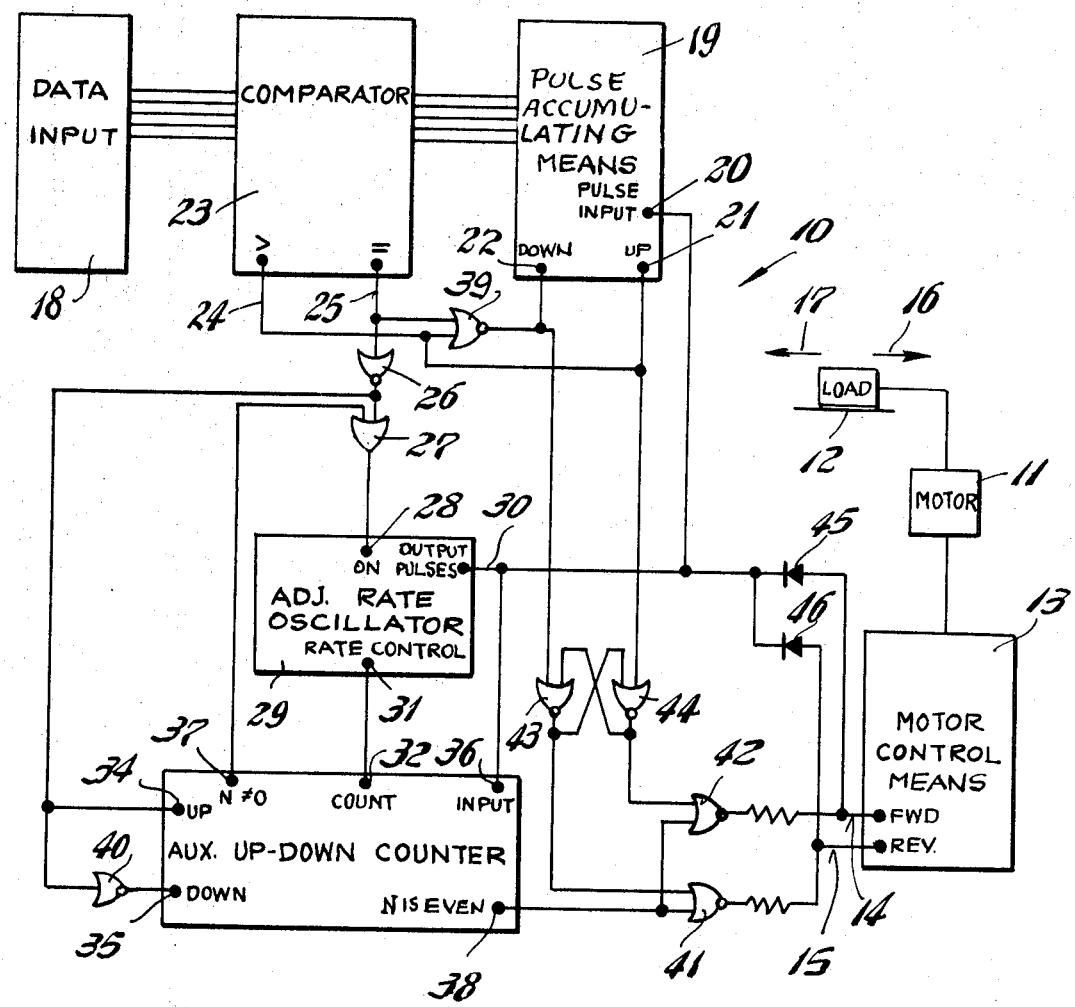

NUMERICALLY CONTROLLED ABSOLUTE MOTOR SYSTEM

In U.S. Pat. No. 3,466,517 assigned to the assignee of the present invention, there is disclosed a numerical control system which accepts information to control the movement of the stepping motor. The information is in the form of an absolute coordinate of a desired position which the stepping motor must achieve so as for example to precisely position a machine tool bed. The system includes a pulse-accumulating means which maintains in absolute coordinate a digital count related to the present position of the motor. When a difference occurs between the present and the desired position of the motor as when the digital input information is different than the digital count of the pulse-accumulating means, the motor is caused to step in the direction which reduces the difference to zero. At a zero difference the motor has moved its load to the desired position. However, it is generally desirable to operate the motor at a speed which is as rapid as possible in order to decrease the time for movement. But, with a stepping motor, which must move one step for each pulse in the system to maintain errorless operation, it is generally required that the motor stepping rate be initially slow, accelerated to an intermediate rate and then decelerated to its final steps. In an absolute system of the type where a train of pulses is supplied until a difference count of zero is attained, an indication of the number of steps remaining in the movement of the motor before it is to stop has been difficult to readily attain. Without such an indication the motor cannot be decelerated.

While the above-noted U.S. patent discloses a system providing an indication or signal usable to control deceleration, it has been found that while such a system is usually satisfactory it is not conducive to high-speed operation. Thus while the system will perform readily when the motor steps at a maximum rate of 500 steps per second, it is not completely satisfactory when the maximum motor rate is 5,000 steps per second. The system requires that initially before any motor movement that the first pulses of a train be fed to a counter, not the motor, and when the counter is full, then pulses are fed to the motor. In order to be able to control small movement of a few steps, the maximum count of the counter must be small which thereby limits the number of pulses that are available to control deceleration. Thus the system not only has an initial lag period before motor movement but also it has a limited control over deceleration.

It is accordingly an object of the present invention to provide a numerical control system for use with a stepping motor in which the information of the desired position is introduced in absolute coordinates and yet the system provides acceleration control for a fraction of the total movement of the motor and deceleration for the remaining fraction of the movement irrespective of the total movement of the motor.

Another object of the present invention is to provide a system which provides an indication when the motor is intermediate its movement thereby permitting a substantially high number of steps for deceleration control of the motor.

A further object of the present invention is to achieve the above objects with a system which is relatively simple in construction, durable in use, economical to manufacture and which does not have an initial time lag prior to initiating movement of the motor.

In carrying out the present invention, the numerically controlled system includes a data input means in which digital information in absolute coordinate of the desired position is introduced such as a count in BCD code and a pulse-accumulating means which maintains a digital count that is directly related to the present position of the motor. Upon actuation, a comparator determines which count is larger and uses this determination to control the direction, whether up or down in which the pulse-accumulating means is to change its count and also the direction in which a motor control is to cause the motor to step. An oscillator supplies pulses with each pulse causing the pulse-accumulating means to change its count in the direction which decreases the difference between the data input count and the position indicator count. When the two counts are equal, further pulses from the oscillator are prevented from changing the count.

The pulses are also supplied to an auxiliary up-down counter which receives every pulse that the pulse-accumulating means receives and thus will count the number of pulses necessary to bring the input and position indicator count difference to zero. The motor control is also connected to receive the pulses from the oscillator but the pulses are only permitted to pass through a gate to the motor control when the count of the auxiliary counter is divisible by a whole number, such as 2 or 3, etc. If the whole number is 2 then the motor will only have received one-half the number of pulses that the pulse-accumulating means and counter have received before the count difference is zero. With the count difference being zero, the counter is caused to count down for every pulse thereafter received and while it counts down the motor will again receive only the pulses which cause the counter to have a count divisible by the selected whole number.

If the whole number is 2, the motor will take a step for every odd pulse that the counter counts up and every odd pulse that the counter counts down. Thus when the counter shifts the direction of its count, an indication is provided that the halfway point of the motor movement is reached and of the number of steps remaining in the movement. By using the counter count, acceleration can be regulated while the counter is counting up and deceleration regulated while the counter is counting down. When the counter has reached its zero count, the oscillator is stopped preventing further pulses.

Other features the advantages will hereinafter appear.

In the drawing:

The sole FIGURE is a diagrammatic and electrical schematic representation of the system.

Referring to the drawing, the system is generally indicated by the reference numeral 10 and includes a stepping motor 11 connected to a load 12 to move the load an increment of movement for each s step of the motor. The motor produces a step upon a change of energization produced by a motor control means 13 which has two input channels, a forward channel 14 and a reverse channel 15. Each pulse received on the forward channel causes the motor to step in the forward direction shown by arrow 16 while each pulse received on the channel 15 causes the motor to move one step in the reverse direction indicated by arrow 17.

The system includes a data input means 18 into which information of a desired position of the load in a numerical absolute coordinate is introduced. This information is preferably in the form of a binary coded decimal number which may be effected by positions of switches, obtained from a punched tape or other information bearing media. Also provided is a pulse-accumulating means 19 which is essentially a BCD up-down counter having a terminal 20 which receives pulses, a terminal 21 which directs the pulse-accumulating means to increase its count by one for each pulse and another terminal 22 which if energized directs the pulse-accumulating means to decrease its count by one count for each pulse. Either one of the terminals 21 or 22 may be energized but not both simultaneously. If neither is energized, the count will not change for each pulse.

The count of the pulse-accumulating means and the count of the data input are supplied to a comparator 23 which provides an indication that the data input count is greater than the pulse-accumulating means count by a signal on a lead 24 or if the two counts are equal, by a signal on a lead 25. The two counts are continuously compared throughout the movement of the motor.

The lead 25 through a NOR gate 26 and an OR gate 27 is connected to an ON terminal of an adjustable rate oscillator 29. The oscillator is energized only with a signal on its ON terminal and when so energized it produces output pulses on a lead 30 at a rate determined by the value of a voltage supplied to a rate control terminal 31. The above data input 18, comparator 23, pulse-accumulating means 19 and adjustable rate oscillator 29 are essentially identical to those shown and described in the above-noted copending application.

The rate control terminal 31 is connected to a count terminal 32 of an auxiliary up-down counter 33 which produces a voltage on the terminal 31 which is related to the actual count of the counter. The counter 33 also has an up terminal 34 and a down terminal 35 to direct in which direction the count is to go for each pulse received on an input terminal 36 connected to the oscillator output lead 30. Additional information supplied by the counter 33 is at a terminal 37 which information is that the count is not 0 and at a terminal 38 which indicates that the count is even. The counter 31 may be a binary counter but could if desired be a BCD counter. Other components of the system are shown together with their interconnections and they consist essentially of NOR gates 39, 40, 41, 42, 43 and 44 together with a pair of diodes 45 and 46.

In the operation of the system assuming that the data input represents a position which requires a movement of the motor in a forward direction, as indicated by the arrow 16, from its previous position, the count of the data input will be greater than the count of the pulse-accumulating means. The comparator output will have a 1 (a signal) on the lead 24 and a 0 (no signal) on the lead 25 because the count of the data input will be greater than the count of the pulse-accumulating means and not equal thereto. This produces on the output of the gate 39 a 0 to the down terminal 22 of the pulse-accumulating means and a 1 to the up terminal 21. Also one input of the gate 43 will have a 0 and an input of the gate 44 will have a 1 which results in an input of the gate 41 having a 1 and an input of the gate 42 having a 0. As the gate 41 is a NOR gate and has a 1 input, it produces a 0 or ground voltage on the reverse channel 15 while the output of the NOR gate 42 may be either a 0 or 1 and hence have either a 0 (ground voltage) or a 1 (positive voltage) on the channel 14.

The motor control 13 is responsive to negative pulses on the oscillator lead 30 and whenever a channel is 1 or positive, the pulse will pass through the channel while a pulse will not pass if the voltage on the channel is ground.

The lead 25 is 0 producing through a NOR gate 26 a 1 to one of the inputs of the OR gate 27 which has an output of 1 and consequently turns on the oscillator 29 to effect the supply of pulses on the lead 30. Simultaneously the 1 output of the NOR gate 26 places a 1 on the up terminal 34 and a 0 on the down terminal 35 of the counter 33.

The oscillator produces pulses with the pulses being directed to the input 36 of tee counter 33 which by reason of the 1 on the up terminal 34 causes the counter to increase its count with each pulse. Also the pulse is directed through the diodes 45 and 46 to the channels 14 and 15. The channel 15 will be 0 (i.e. ground voltage) irrespective of the state of the other input to the gate 41 because one of its inputs is 1 and hence pulses on this channel will be blocked.

On the other hand, the gate 42 has one input 0 and another input that is connected to the N is even terminal 38 of the counter 33 and thus every time the count of the counter 33 is even, a 1 appears and every time the count is odd a 0 appears (a zero count is assumed even). With both inputs 0, by the count being odd, the output of the gate 42 will be a 1 producing a positive voltage on the channel 14 which when a negative pulse appears on the lead 30, permits it to pass into the motor control. Accordingly, every other pulse that is fed into the counter and to the motor control is passed into the forward channel 14 and serves to step the motor while pulses are prevented from appearing at the reverse channel 15.

The voltage that appears at the count terminal 31 is directly related to the count of the counter and as the count increases, the voltage increases to increase the rate or frequency of the pulses from the oscillator. The rate of the oscillator will continue to increase in relation to the count until it either reaches its maximum at which it is maintained or else until the comparator indicates that the data input and the pulse-accumulating means have the same count. The motor control effectively causes each pulse received to be essentially instantaneously transferred into a change of energization of the motor 11 to produce a step so that the motor stepping speed is directly the same as the rate at which pulses are received by the motor control on one of its channels.

When the counts of the data input and the pulse-accumulating means are equal, the number of pulses that have been supplied to the pulse-accumulating means is the number of steps the motor must take, the count of the counter is this same number but the motor has only moved one-half this number of steps. With an equal condition, neither of the down or up terminals of the pulse-accumulating means has a 1 by reason of the terminal 25 being 1 and hence it will not change its count if input pulses are supplied to the terminal 20. The steering gates 43 and 44 will remain the same as previously with the gate 44 having a 0 output even though one of its input changes to a 1 in view of the retention of the 1 on the other input. The appearance of the 1 on the equal terminal 25 changes the output of the NOR gate 26 to a 0 which removes the 1 on the up terminal 34 and places a 1 on the down terminal 35 of the counter 33. The oscillator continues to function to produce pulses as the output of the OR gate 27 is 1, each pulse is down counted by the counter, and every odd count of the counter permits a pulse to be passed to the forward channel 14. The motor will continue to move for each pulse passed on its forward channel and as the down counter decreases its count, the rate of the oscillator is decreased in proportion to the count of the counter. When the count of the counter is zero, the terminal $N \neq 0$ becomes a 0, producing a 0 at the output of OR gate 27, stopping the oscillator and preventing the appearance of any further pulses.

It will be understood that the motor has now moved a number of steps equal to the difference that was initially present between the data input and the pulse-accumulating means counts and the movement is in the direction which decreased the difference. The count of the pulse-accumulating means is now directly related to the position of the load 12. The speed at which the motor operated during the first half of its movement while the counter was counting up was at an accelerating rate and upon reaching the midpoint of movement, the motor could begin to be decelerated when the counter started its down count. Thus irrespective of the number of steps in the movement (provided there is more than one) the motor speed may be accelerated for one-half the movement and decelerated for the other half thereby enabling the system to maintain the motor speed within the capabilities of the motor so that is will errorlessly respond to each pulse of the motor control.

For the condition where the data input information is less than the pulse-accumulating means count, the motor is required to move in the reverse direction indicated by the arrow 16 and the forward channel will have a 0 representative voltage while the reverse channel will have a 1 representative voltage for every count of the counter which is even.

While the system as specifically described, divides the movement in half, it will be understood that in some instances it may be desirable to have the movement divided differently as for example into a one-third division. One example is where the load is a "pulling" load which would required greater deceleration control.

The voltage at the terminal 32 which is related to the count of the counter has been described as being the same irrespective of whether the counter is counting up or counting down and hence the rate of acceleration and deceleration will be the same. If necessary, however, this may be altered to have different rates. One construction for controlling the rate of the oscillator according to a count of a counter is shown in U.S. Pat. application Ser. No. 759,004, assigned to the assignee of the present invention.

It will accordingly be understood that there has been disclosed a numerical control system that is capable of accepting absolute information of a desired position and causing a motor to move a load to the desired position. The motor is a stepping motor and its speed is regulated as to the rate it will accelerate at the beginning of the movement and the rate at which it will decelerate at the end of its movement. A motor controller causes the motor to step one step for each pulse that it receives and the system produces a train of pulses until its number equals the number of steps required by the motor to produce the necessary movement. However, the pulses are fed to a counter which only permits the fraction of the pulses in the train to reach the motor controller as it counts the number and when the train stops, the counter uncounts and permits the remaining fraction of the pulses to effect stepping. When the counter is counting up, the motor is in its accelerating phase and its stepping rate is controlled by the count while when the counter is counting down, the motor is in its decelerating phase and the decreasing count will decrease the speed of the motor. Accordingly, irrespective of the movement required of the motor, the system not only divides the movement into an accelerating phase and a decelerating phase but also maintains information for regulating the stepping rate with respect to the steps taken during acceleration and the steps remaining during deceleration for enabling a final regulation.

Variations and modifications may be made within the scope of the claims and portions of the improvements may be used without others.

We claim:

1. A numerically controlled system of the absolute type comprising a stepping motor adapted to be connected to a load to move the load an increment for each change of energization supplied to the motor, motor control means having an input on which pulses are applied and an output connected to the motor for supplying a change of energization to said motor for each pulse applied, pulse-accumulating means for maintaining a numerical count representative of the theoretical present position of a load from a reference position between movements, data input means for supplying a numerical count of the desired theoretical position of the load from the reference position, comparator means connected to the pulse-accumulating means and the data input means for comparing the pulse-accumulating means count and the data input means count and providing a signal when the counts are unequal, oscillator means under the control of the signal from the comparator means for supplying a first train of pulses to the pulse-accumulating means until the comparator means indicates its count equals the count of the data input means and then supplying a second train of pulses with only the first train being supplied to the pulse-accumulating means, means for counting each pulse of the first train of pulses and for subtracting each pulse of the second train, means for permitting only a fraction of the first train of pulses and a complementary fraction of the second train of pulses to be applied to the motor control means, with the total number of pulses applied to the motor control means being equal to the number of pulses in the first train, means for terminating the second train of pulses when the count of the counting means is zero and means related to the count of the counting means for controlling the rate at which pulses are supplied by the oscillator means.

2. The invention as defined in claim 1 in which the first train of pulses is numerically equal to the second train of pulses, in which the fraction of the pulses applied to the motor control means of said first train is one-half and in which the complementary fraction of tce pulses applied of said second train is one-half.

3. The invention as defined in claim 2 in which the number of pulses in both trains is equal to the number of changes of energization of the motor theoretically required to move the load from its present position to its desired position.

4. The invention as defined in claim 1 in which the last-named means includes means connected between the oscillator means and the counting means for varying the rate of the oscillator means in direct relation to the count of the counting means.

5. The invention as defined in claim 4 in which the counting means initially has a zero count and increases its count by one for each pulse in the first train and in which the rate of the oscillator means increases with the count to effect acceleration of the motor.

6. The invention as defined in claim 4 in which the counting means has a count equal to the number of pulses in the first train at the termination of the train, in which the second train of pulses decreases the count of the counting means for one count for each pulse thereof and in which the oscillator means decreases its rate as the count of the counting means decreases to effect deceleration of the motor.

7. The invention as defined in claim 1 in which the motor control means input includes a forward and reverse channel, there are means for supplying pulses to both channels, in which the comparator means supplies another signal determined by which numerical count is larger and in which there are the another signal utilization means for blocking pulses supplied to one channel while permitting pulses to be applied to the other channel to thereby control the direction of stepping of the motor in accordance with the relative values of the counts.

8. The invention as defined in claim 8 in which the said signal utilization means remains effective for both the first train of pulses and for the second train of pulses.

PO-1050
(5/69)

UNITED STATES PATENT OFFICE
CERTIFICATE OF CORRECTION

Patent No. 3,582,751          Dated June 1, 1971

Inventor(s) Hermann Rosshirt and Albert C. Leenhouts

It is certified that error appears in the above-identified patent and that said Letters Patent are hereby corrected as shown below:

Page 1, line 2, "both of Hartford" should be "Bristol" and "Granby", respectively.

Column 1, line 19, "a" is omitted before "movement".

Column 2, line 29, "the" should be "and".

Column 2, line 40, "one step" is omitted after "step".

Column 3, line 44, "tee" should be "the".

Column 4, line 55, "required" should be "require".

Column 6, line 10, (claim 2) "tee" should be "the".

Column 6, line 43, (claim 8) "8" should be "7".

Column 6, line 44, (claim 8) "another" is omitted before "signal".

Signed and sealed this 7th day of December 1971.

(SEAL)
Attest:

EDWARD M. FLETCHER, JR.      ROBERT GOTTSCHALK
Attesting Officer              Acting Commissioner of Patents